(12) United States Patent
Murashima (10) Patent No.: US 8,052,241 B2
(45) Date of Patent: Nov. 8, 2011

(54) RECORDING APPARATUS, RECORDING DATA GENERATING APPARATUS, PROGRAM, AND DATA STRUCTURE

(75) Inventor: Hiroshi Murashima, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1075 days.

(21) Appl. No.: 11/863,908

(22) Filed: Sep. 28, 2007

(65) Prior Publication Data

US 2008/0259373 A1    Oct. 23, 2008

(30) Foreign Application Priority Data

Sep. 29, 2006    (JP) .................. 2006-270058

(51) Int. Cl.
*B41J 29/38* (2006.01)
(52) U.S. Cl. .................. 347/14; 347/13; 347/9
(58) Field of Classification Search .......... 347/13, 347/14, 9
See application file for complete search history.

(56) References Cited

U.S. PATENT DOCUMENTS 5,984,454 A    11/1999    Takahashi et al.
7,362,471 B2    4/2008    Date

FOREIGN PATENT DOCUMENTS

| JP | 5-116383 A | 5/1993 |
| JP | 6-209416 A | 7/1994 |
| JP | 2001-287411 A | 10/2001 |
| JP | 2002-264401 A | 9/2002 |
| JP | 2004-122376 A | 4/2004 |

OTHER PUBLICATIONS

JP Office Action dtd Oct. 7, 2008, JP Appln. 2006-270058, partial English translation.

*Primary Examiner* — Julian Huffman
(74) *Attorney, Agent, or Firm* — Banner & Witcoff, Ltd.

(57) ABSTRACT

A recording apparatus includes a feeding device for feeding a recording medium, recording heads arranged along a feeding direction and extending in a direction orthogonal to the feeding direction, and a control unit for controlling the recording heads, and including storage for storing printing cycle data for printing cycles. For each printing cycle the printing cycle data includes head drive data and head identifying data identifying each head in a corresponding positional relationship with the recording medium in the feeding direction. As the recording medium advances in the feeding direction, the number of heads identified by the head identifying data in a printing cycle changes over time. Also, the apparatus includes a drive unit for reading the printing cycle data associated with a corresponding printing cycle and drives each head identified by the head identifying data based on the head drive data corresponding to the printing cycle data.

12 Claims, 6 Drawing Sheets

| Group | Col 75 | Col 74 | Group | Col | Col | Group | Col | Col |
|---|---|---|---|---|---|---|---|---|
| A | K1 | K | | K31 | C | | C91 | M |
| | K2 | K | | C21 | M | | M81 | Y |
| | ⋮ | | | M11 | Y | | Y71 | C |
| | ⋮ | | | Y1 | K | | C92 | M |
| 72(73) | K10 | K | | K32 | C | | M82 | Y |
| | K11 | C | | C22 | M | | Y72 | C |
| | C1 | K | | M12 | Y | | C93 | M |
| | K12 | C | | Y2 | K | B+C+D | M83 | Y |
| | C2 | K | | K33 | C | | Y73 | C |
| A+B | K13 | C | A+B+C+D | C23 | M | | ⋮ | |
| | C3 | K | | M13 | Y | | ⋮ | |
| | ⋮ | | | Y3 | K | | C100 | M |
| | ⋮ | | | ⋮ | | | M90 | Y |
| 73 {72{ | K20 | C | | ⋮ | | | Y80 | M |
| 72{ | C10 | K | 72{ | K40 | C | | M91 | Y |
| | K21 | C | 72{ | C30 | M | | Y81 | M |
| | C11 | M | 73 72{ | M20 | Y | | M92 | Y |
| | M1 | K | 72{ | Y10 | K | | Y82 | M |
| | K22 | C | | ⋮ | | | M93 | Y |
| | C12 | M | A+B+C+D | ⋮ | | C+D | Y83 | M |
| | M2 | K | | K91 | C | | ⋮ | |
| | K23 | C | | C81 | M | | ⋮ | |
| A+B+C | C13 | M | | M71 | Y | | M100 | Y |
| | M3 | K | | Y61 | K | | Y90 | Y |
| | ⋮ | | | K92 | C | | Y91 | Y |
| | ⋮ | | | C82 | M | | Y92 | Y |
| 73 {72{ | K30 | C | | M72 | Y | D | ⋮ | |
| 72{ | C20 | M | | Y62 | K | | ⋮ | |
| 72{ | M10 | K | | K93 | C | | Y100 | O |
| | | | A+B+C+D | C83 | M | | | |
| | | | | M73 | Y | | | |
| | | | | Y63 | K | | | |
| | | | | ⋮ | | | | |
| | | | | ⋮ | | | | |
| | | | | K100 | C | | | |
| | | | | C90 | M | | | |
| | | | | M80 | Y | | | |
| | | | | Y70 | C | | | |

RECORDING APPARATUS, RECORDING DATA GENERATING APPARATUS, PROGRAM, AND DATA STRUCTURE

CROSS REFERENCE TO RELATED APPLICATION

This application claims priority from Japanese Patent Application No. 2006-270058, filed on Sep. 29, 2006, the entire subject matter of which is incorporated herein by reference.

BACKGROUND

1. Field

Aspects of the present invention relate to a recording apparatus for forming an image on a recording medium, a recording data generating apparatus, a program, and a data structure.

2. Description of the Related Art

Some printers for recording color images on a recording medium such as recording paper include recording heads corresponding to respective colors such as black (K), cyan (C), magenta (M), and yellow (Y) relating to the color image to be recorded and image memories in which image data relating to the respective colors are stored. The recording heads are arranged in parallel to each other in a feeding direction so that the positions of both ends in the longitudinal direction are aligned, and are driven on the basis of the image data read from the image memories in association with feeding of the recording paper. Therefore, dots are recorded on the recording paper in sequence from the recording head arranged on the upstream side. That is, dots in the image to be recorded are formed at different timings by the respective recording heads. Therefore, a technology for constituting image memories with delay memories separately for each color and differentiating the timings of driving the recording heads by the respective delay memories which delay data outputs according to the arranged positions of the recording heads (for example, JP-A-2001-287411) is known.

SUMMARY

Aspects of the invention provide a recording apparatus, a recording data generating apparatus, a program, and a data structure.

According to some aspects, a recording apparatus includes a feeding device for feeding a recording medium in a feeding direction, recording heads, each arranged along the feeding direction and extending in a direction orthogonal to the feeding direction of the recording medium, the recording heads configured to oppose the recording medium being fed, and a control unit for controlling the recording heads. The control unit includes a storage unit for storing printing cycle data for printing cycles. For each of the printing cycles the printing cycle data includes head identifying data and head drive data. The head identifying data identifies each recording head in a corresponding predetermined positional relationship with the recording medium in the feeding direction. As the recording medium advances in the feeding direction, the number of recording heads identified by the head identifying data in a printing cycle changes over time. The recording apparatus can include a drive unit for reading the printing cycle data associated with a corresponding one of the printing cycles stored in the storage unit and driving each recording head identified by the head identifying data based on the head drive data corresponding to the printing cycle data associated with the corresponding one of the printing cycles.

BRIEF DESCRIPTION OF THE DRAWINGS

A more complete understanding of the present invention and the potential advantages thereof may be acquired by referring to the following description of illustrative embodiments in consideration of the accompanying drawings.

DETAILED DESCRIPTION

Referring now to the drawings, an illustrative embodiment of the invention will be described.

Figure 1:
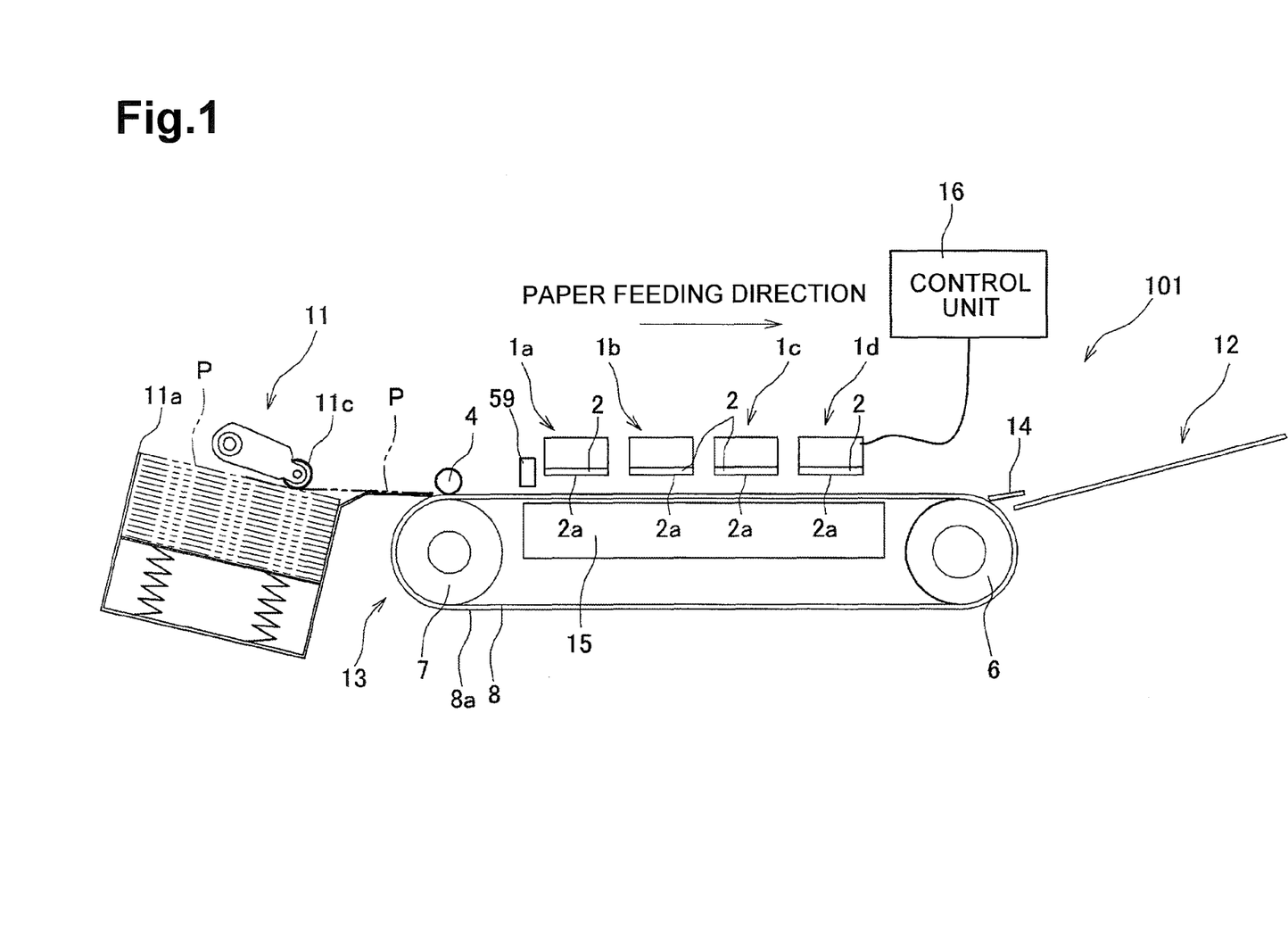
FIG. 1 is a side view of an ink-jet printer according to a first illustrative embodiment of the invention.

FIG. 1 is a schematic side view showing a general configuration of an ink-jet printer according to an illustrative embodiment of the invention. As shown in FIG. 1, an ink-jet printer (recording apparatus) 101 is a color ink-jet printer having four ink-jet heads (recording heads) 1a to 1d. The ink-jet printer 101 includes a control device (control unit) 16 that controls the entire ink-jet printer 101. The ink-jet printer 101 includes a paper feed unit 11 on the left side in the drawing and a paper discharge unit 12 on the right side in the drawing.

In the interior of the ink-jet printer 101, there is formed a paper feed path through which paper (recording medium) P is fed from the paper feed unit 11 toward the paper discharge unit 12. The paper feed unit 11 includes a paper stocker 11a and a pickup roller 11c. The paper stocker 11a serves to store a number of papers P stacked in the interior thereof. The pickup roller 11c serves to pick up the papers P stacked in the paper stocker 11a one-by-one from the top and feed the picked-up paper P toward the downstream side. The paper P fed from the paper stocker 11a by the pickup roller 11c is placed on an outer peripheral surface 8a of a feed belt 8.

A belt feed mechanism 13 includes two belt rollers 6 and 7, the endless feed belt 8 wound around both rollers 6 and 7 so as to extend therebetween, and a platen 15 arranged at a position opposing the ink-jet heads 1a to 1d in an area surrounded by the feed belt 8. The belt feed mechanism 13 is provided at a midsection of the paper feed path. The platen 15 serves to support the feed belt 8 so that the feed belt 8 does not sag downward in the area opposing the ink-jet heads 1a to 1d. Arranged at a position opposing the belt roller 7 is a nip roller 4. The nip roller 4 serves to press the paper P against the outer peripheral surface 8a when the paper P is placed on the outer peripheral surface 8a of the feed belt 8 by the pickup roller 11c of the paper feed unit 11. The paper P arranged on the outer peripheral surface 8a of the feed belt 8 is fed by the feed belt 8 which is driven by a feed motor 19 (see FIG. 2). A paper sensor 59 is arranged on the immediate upstream side of the ink-jet head 1a. The paper sensor 59 serves to sense whether or not the fed paper P reaches a print-start position which is located on the immediate upstream side of the ink-jet head 1a, and is arranged so as to be capable of detecting the trailing end of the paper P which is located at the print-start position.

A separating mechanism 14 is provided on the immediate downstream side of the feed belt 8. The separating mechanism 14 is adapted to separate the paper P adhered on the outer peripheral surface 8a of the feed belt 8 from the outer peripheral surface 8a and feed the same toward the paper discharge unit 12 on the right side of the drawing.

The ink-jet head 1a corresponds to black (K) ink, the ink-jet head 1b corresponds to cyan (C) ink, the ink-jet head 1c corresponds to magenta (M) ink, the ink-jet head 1d corresponds to yellow (Y) ink, and four of these ink-jet heads are arranged in parallel to each other in sequence along the feeding direction of the paper P. That is, the ink-jet printer 101 is a line-type printer. The four ink-jet heads 1a to 1d include a head body 2 respectively at the lower end thereof. The head body 2 is formed into a thin parallelepiped shape elongated in the direction orthogonal to the feeding direction. A bottom surface of the head body 2 serves as an ink discharge surface 2a opposing the outer peripheral surface 8a of the feed belt 8. On the ink discharge surface 2a, ink discharge ports are arranged to form ink discharge port rows extending in the direction orthogonal to the feeding direction. When the paper P fed by the feed belt 8 passes through immediately below the four head bodies 2 in sequence, ink drops of respective colors are discharged from the ink discharge surfaces 2a toward a printing area formed on the upper surface, in other words, the printing surface of the paper P on the basis of the instruction from the control device 16. Accordingly, a desired color image is printed on the printing area of the paper P.

Figure 2:
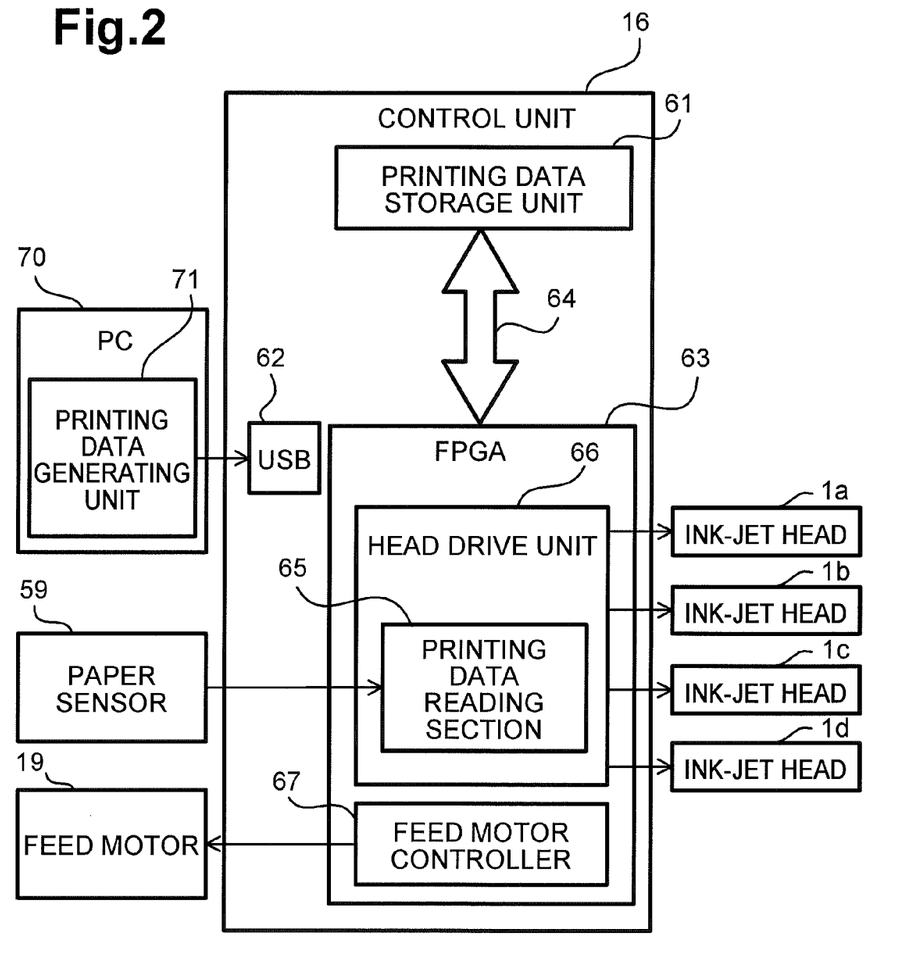
FIG. 2 is a block diagram showing a function of a control device shown in FIG. 1.

Referring now to FIG. 2, the control device 16 will be described in detail. FIG. 2 is a block diagram showing a function of the control device 16. As shown in FIG. 2, the control device 16 includes a printing data storage unit 61, a USB (Universal Serial Bus) interface 62, and FPGA (Field Programmable Gate Array) 63. The control device 16 is able to transmit data with a PC (Personal Computer) 70 via the USB interface 62.

Figure 3:
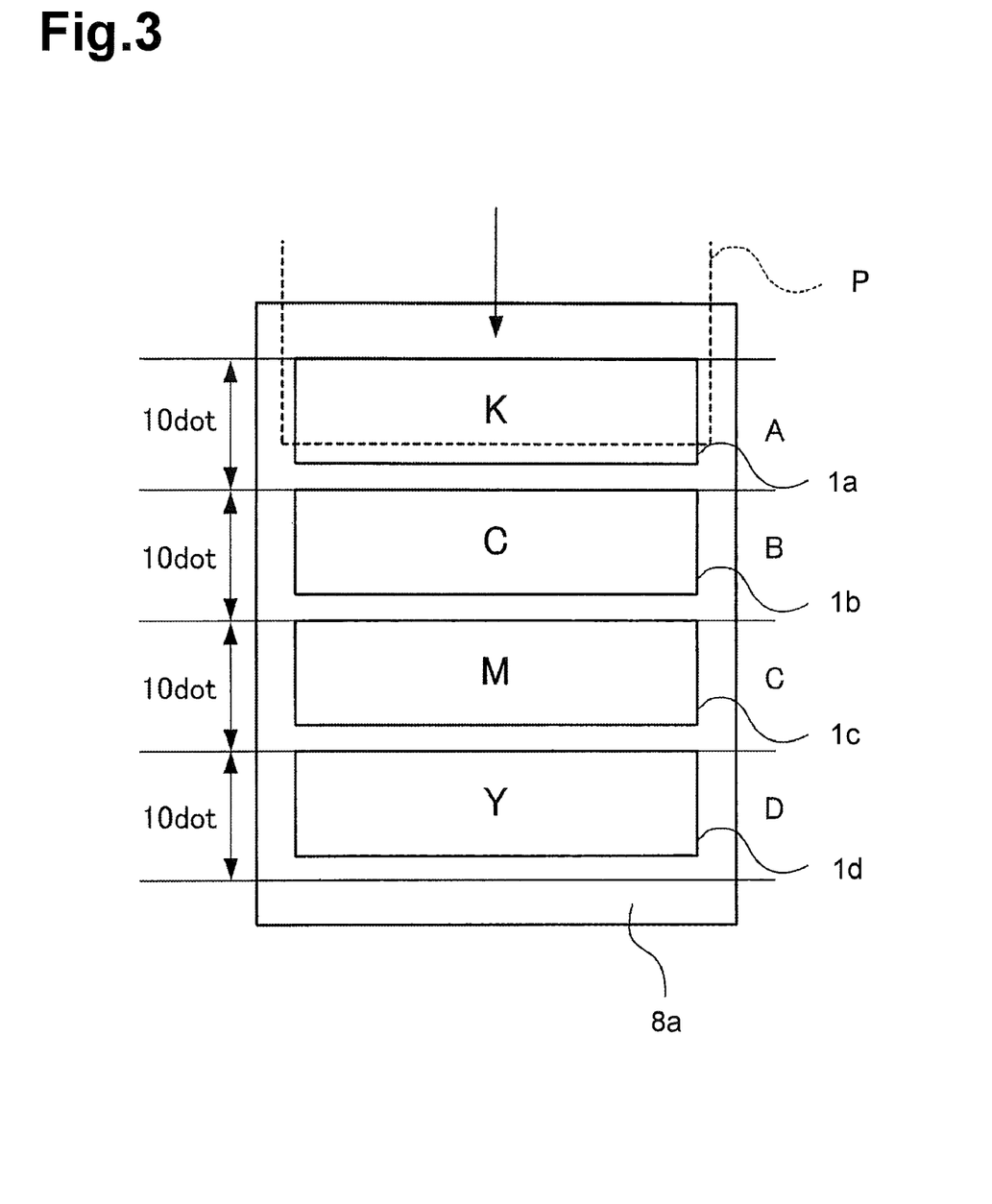
FIG. 3 is a pattern diagram showing an arrangement of ink-jet heads in the ink-jet printer shown in FIG. 1.
Figure 4:
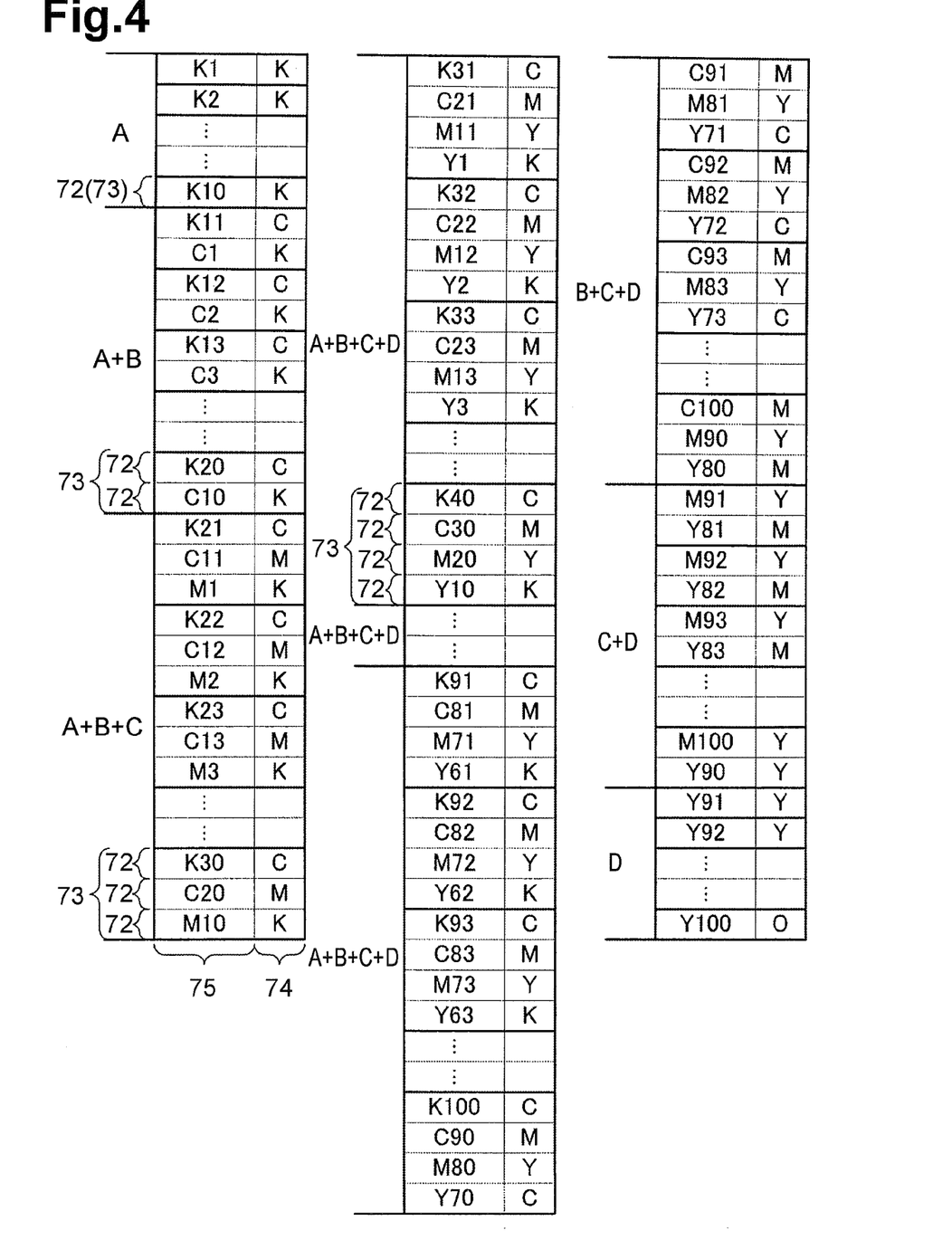
FIG. 4 is a drawing showing an example of a data structure of print data generated by the printing data generating unit shown in FIG. 2.

The PC 70 includes a driver for controlling the ink-jet printer 101 integrated therein. The driver includes a printing data generating unit 71 (recording data generating apparatus) 71. The printing data generating unit 71 generates print data to be transferred to the ink-jet printer 101 on the basis of original data of the color image to be printed on the paper P and specific information of the ink-jet printer 101. Referring now to FIG. 3 and FIG. 4, the print data will be described. FIG. 3 is a pattern diagram showing an arrangement of the ink-jet heads 1a to 1d in the ink-jet printer 101. FIG. 4 is a drawing showing an example of a data structure of the print data. For the sake of convenience of description, the arrangement of the ink-jet heads 1a to 1d and the data structure of the print data will be described briefly. In FIG. 4, the data structure illustrates a case in which the color image to be printed on the paper P has a length of 100 dots in the paper feeding direction.

As shown in FIG. 3, the four ink-jet heads 1a to 1d are arranged in the order of black (K), cyan (C), magenta (M), and yellow (Y) along the feeding direction of the paper P. The distance between upstream ends of two adjacent ink-jet heads in the feeding direction is a distance corresponding to 10 dots which correspond to the printing resolution of the color image to be printed on the paper P in the feeding direction. The specific information of the inkjet printer 101 includes the distance between the upstream ends of two adjacent ink-jet heads (i.e., 1a and 1b, 1b and 1c, and 1c and 1d) in the feeding direction, the pitches of the ink discharge ports in the feeding direction, and the positions of the ink discharge port rows on the respective ink-jet heads in the feeding direction.

Areas on the outer peripheral surface 8a of the feed belt 8 opposing ranges from the upstream ends of the respective ink-jet heads 1a to 1d to the distance corresponding to 10 dots in the feeding direction are discharge areas A to D in sequence from the upstream side. In other words, the discharge area A is a rectangular area including an area opposing the ink-jet head 1a for black (K), and the discharge area B is a rectangular area including an area opposing the ink-jet head 1b for cyan (C), the discharge area C is a rectangular area including an area opposing the ink-jet head 1c for magenta (M), and the discharge area D is a rectangular area including an area opposing the ink-jet head 1d for yellow (Y).

The respective discharge areas A to D are arranged to be adjacent to each other in the feeding direction of the paper P. Therefore, the portion of the paper P opposing the discharge areas A to D changes in association with advancement of the paper P in the feeding direction. More specifically, the paper P opposes the discharge area A while the leading edge of the paper P advances from the upstream end (the print-start position for no-frame printing) of the discharge area A by 10 dots, the paper P opposes the discharge areas A and B while the leading edge of the paper P further advances by 10 dots, and the paper P opposes the discharge area A to C while the leading edge of the paper P further advances by 10 dots. The paper P opposes the discharge areas A to D while the trailing edge of the paper P advances to a position having 30 dots remaining from the downstream end (the print-end position for the no-frame printing) of the discharge area D, the paper P opposes the discharge areas B to D while the trailing edge of the paper P further advances to a position having 20 dots remaining from the print-end position, the paper P opposes the discharge areas C and D while the trailing edge of the paper P further advances to a position having 10 dots remaining from the print-end position, and the paper P opposes the discharge area D while the trailing edge of the paper P advances further to the print-end position.

As shown in FIG. 4, the print data has a structure in which a number of printing cycle data units 73 (thick frame portions in FIG. 4) are arranged. Each printing cycle data unit 73 corresponds to a printing cycle T (see FIG. 5) which is the time required for the paper P to be fed by one dot (unit distance), which corresponds to the printing resolution of the color image to be recorded on the paper P. The illustrative data structure includes four different groups of printing cycle data units 73 having one, two, three or four data blocks. Each data block 72 has a first data field for storing head identifying data 74 and a second data field for storing head drive data 75. The head identifying data 74 and the head drive data 75 each include a predetermined amount of data. Therefore, the data block 72 also has the predetermined amount of data. The amount of data of one data block 72 is an amount which can be transferred in parallel at a time through a data bus 64. The transfer time of the printing cycle data unit 73 is sufficiently shorter than the printing cycle T (see FIG. 5). As described later, a printing data reading section 65 of a head drive unit 66 reads a corresponding printing cycle data unit 73 in the respective printing cycles T. At this time, the printing data reading section 65 reads the printing cycle data unit 73 by a unit of the data block 72 from the top of the data structure shown in FIG. 4 in sequence.

The head identifying data 74 is one of the identifiers "K", "C", "M", and "Y" which are different from each other and correspond to the four ink-jet heads 1a to 1d. Also, the head identifying data identifies one of the ink-jet heads 1a to 1d to which the head drive data 75 of the data block 72 to be read next corresponds. The head identifying data 74 is determined to identify one of the ink-jet heads 1a to 1d which is to be in a predetermined positional relationship with respect to the paper P in the feeding direction in the printing cycle T when the data block 72 is read next. Here, the predetermined positional relationship is determined by the positional relationship between the paper P which advances in the feeding direction and the discharge areas A to D. More specifically, in the printing cycle T when the data block 72 is read next, the head identifying data 74 identifies the ink-jet head 1a for black (K) when the paper P is in the positional relationship opposing only the discharge area A (see "A" in FIG. 4), the ink-jet heads 1a and 1b for black (K) and cyan (C) when the paper P is in the positional relationship opposing only the discharge areas A and B (see "A+B" in FIG. 4), the ink-jet heads 1a to 1c for black (K), cyan (C), and magenta (M) when the paper P is in the positional relationship opposing only the discharge areas A to C (see "A+B+C" in FIG. 4), all the ink-jet heads 1a to 1d when the paper P is in the positional relationship opposing the discharge areas A to D (see "A+B+C+D" in FIG. 4), the ink-jet heads 1b to 1d for cyan (C), magenta (M), and yellow (Y) when the paper P is in the positional relationship opposing only the discharge areas B to D (see "B+C+D" in FIG. 4), the ink-jet heads 1c and 1d for magenta (M) and yellow (Y) when the paper P is in the positional relationship opposing only the discharge areas C and D (see "C+D" in FIG. 4), and the ink-jet head 1d for yellow (Y) when the paper P is in the positional relationship opposing only the discharge area D (see "D" in FIG. 4). In this manner, the print data can be configured such that the number of ink-jet heads 1a to 1d that the head identifying data 74 identifies in a respective printing cycle T increments by one from 1 to 4 and then decrements by one from 4 to 1 as the paper P advances in the feeding direction.

In other words, the data structure is such that the printing cycle data unit 73 adds an ink-jet head (data block 72) to the group of ink-jet heads (the data block(s) 72 in the printing cycle data unit 73) as the paper P advances in the feeding direction until each of the ink jet heads is in the group when the number of the ink-jet heads 1a to 1d (hereinafter referred to as "identified value") that the head identifying data 74 identifies to drive in a respective printing cycle T increases by one. In contrast, once each of the ink jet heads is in the group, the data structure is such that the printing cycle data unit 73 subtracts an ink-jet head (data block 72) from the group of ink jet heads (in the data blocks 72 of the printing cycle data unit 73) when the identified value decrements by one.

The head identifying data 74 also functions as an identifier for determining the end of a printing cycle when the data blocks 72 of a printing cycle data unit 73 for the printing cycle are read in sequence. More specifically, in the printing cycle data unit 73, the data blocks 72 are arranged so that the respective head drive data 75 is read in the order of black (K), cyan (C), magenta (M) and yellow (Y). Therefore, when the head identifying data 74 identifies that the identifiers appeared in a different sequence from the order of "K", "C", "M", and "Y" in relation to the head identifying data 74 included in the data block 72 just read, it is determined that the current data block 72 is the last data block 72 in the printing cycle data unit 73, and the data block 72 which is read next is included in the next printing cycle data unit 73. Furthermore, in the last data block 72 of the print data, the head identifying data 74 is an identifier "0" (i.e. null data) which identifies the end of the print data for the paper P.

The head drive data 75 is data for driving the ink-jet heads 1a to 1d that the head identifying data 74 of the data block 72 just read identifies. In FIG. 4, the respective head drive data 75 is represented by the combination of the identifiers for the ink-jet heads 1a to 1d and numbers of dots (i.e. dot distance) from the leading end of the paper P. Since the head drive data 75 of the first data block 72 at the top of the print data (K1 in FIG. 4) is located at the top of the read addresses, it is read first without any conditions. Therefore, the head drive data 75 is not identified by the head identifying data 74.

Returning back to FIG. 2, the printing data storage unit 61 stores print data transmitted from the PC 70, and includes, for example, DIMM (Dual Inline Memory Module). The FPGA 63 is an integrated circuit in which respective functional parts of a feed motor controller 67 and the head drive unit 66 are realized, and is connected to the printing data storage unit 61 via the data bus 64. The feed motor controller 67 is adapted to control driving of the feed motor 19 that is feeding of the paper P. The head drive unit 66 is adapted to control driving of the ink-jet heads 1a to 1d and includes the printing data reading section 65.

The printing data reading section 65 serves to read the print data stored in the printing data storage unit 61. Reading of print data by the printing data reading section 65 is started when the fact that the fed paper P reaches the print-start position is sensed by a paper sensor 59 and reads the printing cycle data unit 73 in units of data block at every printing cycle T.

Figure 5:
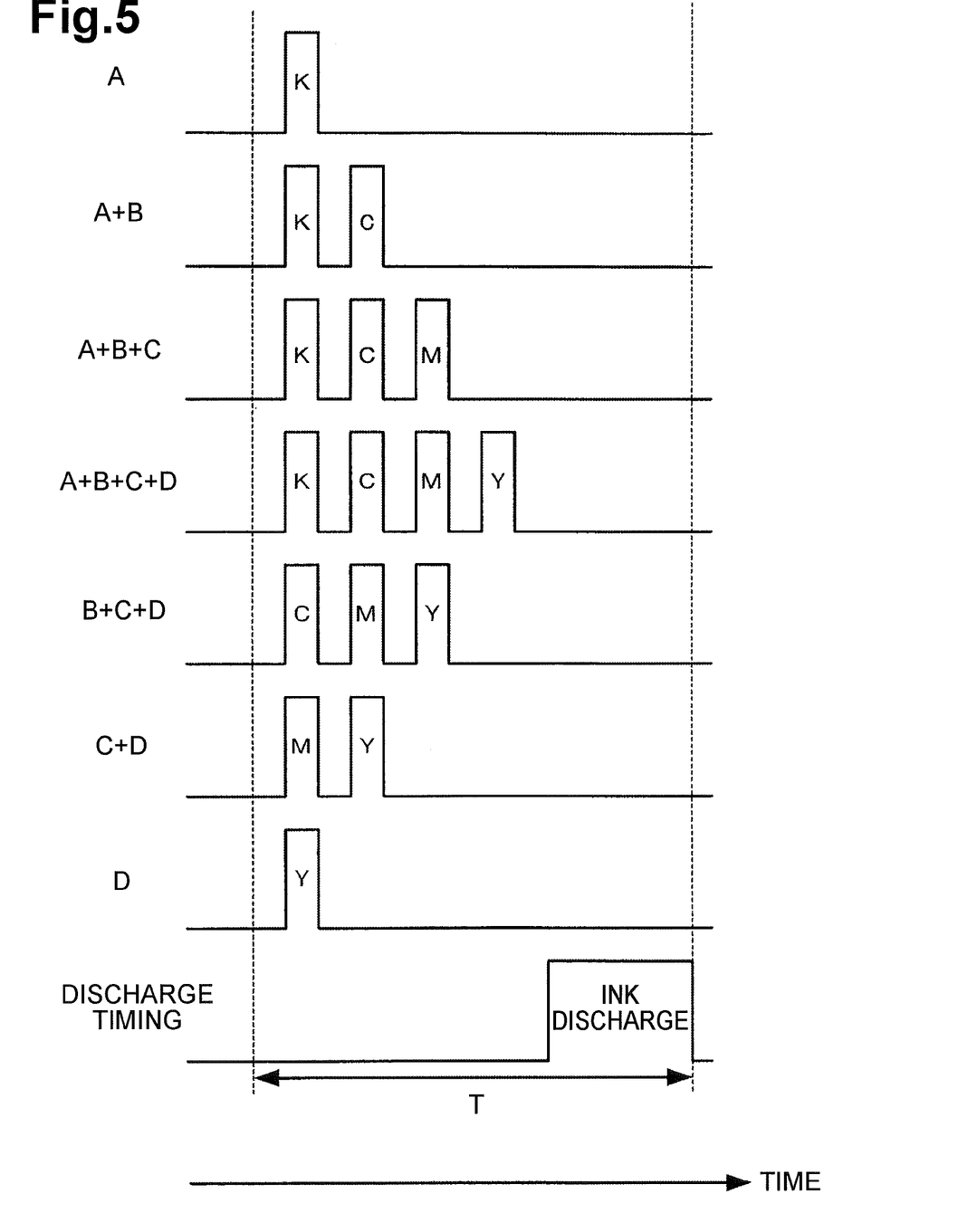
FIG. 5 is a drawing showing a relationship between a position of the paper being fed shown in FIG. 3 and timing when a data block is being read.
Figure 6:
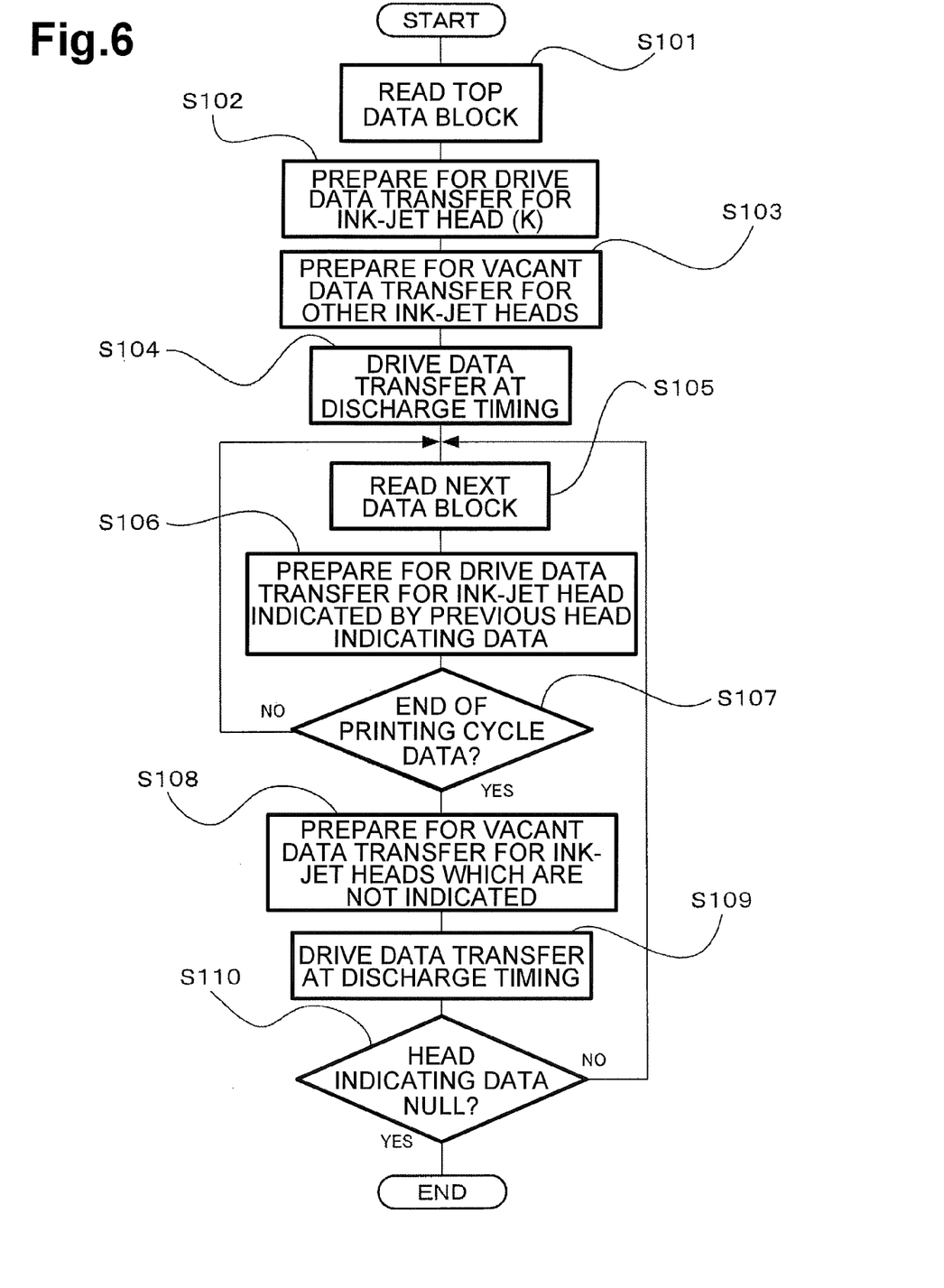
FIG. 6 is a flowchart for describing the operation of a head drive unit shown in FIG. 2.

Referring to FIG. 4 to FIG. 6, the operation of the head drive unit 66 will be described in detail. FIG. 5 is a drawing showing a relation between the fed position of the paper P and the timing when the data block 72 is read. FIG. 6 is a flowchart for describing the operation of the head drive unit 66. As shown in FIG. 4 to FIG. 6, when the reading of the print data is started, the printing data reading section 65 reads the data block 72 from the top of the print data stored in the printing data storage unit 61 (Step S101; hereinafter referred simply to as S101. The same for other steps as well). Since the head drive data 75 relating to the ink-jet head 1a for black (K) is included in the data block 72 at the top (K1 in FIG. 4), the head drive unit 66 converts the corresponding head drive data 75 into a drive signal for driving the ink-jet head 1a for black (K) and performs preparation for transferring the drive signal to the ink-jet head 1a for black (K) (S102). Since the head identifying data 74 included in the corresponding data block 72 is "K" (corresponding to the identified value=1), the printing data reading section 65 performs preparation for converting the head drive data 75 included in the data block 72 which is to be read next (in this case, since the identified value=1, the printing cycle data unit 73 corresponds to one data block 72) into a drive signal for driving the ink-jet head 1a for black (K). Accordingly, the process for the next head drive data 75 may be simplified. Then, since the read data block 72 is the last data block 72 in the printing cycle data unit 73, the printing data reading section 65 stops reading the data block 72 until the next printing cycle T. At this time, preparation for transferring the drive signal which is null data for preventing ink drop discharge to the ink-jet heads 1b to 1d for cyan (C), magenta (M), and yellow (Y) is performed (S103). Then, the head drive unit 66 transfers the prepared drive signals to the respective ink-jet heads 1a to 1d at predetermined timings of discharge relating to the printing cycle T (S104). Accordingly, the inkjet heads 1a to 1d can be driven and the ink drops can be discharged (see column A in FIG. 5).

In the next printing cycle T, the printing data reading section 65 reads next data block 72 (S105). Then, the head drive unit 66 converts the head drive data 75 included in the corresponding data block 72 into a drive signal for driving the ink-jet heads 1a to 1d which is identified by the previous head identifying data 74 and performs preparation for transferring the drive signal to the corresponding ink-jet heads 1a to 1d (S106). On the basis of the head identifying data 74 included in the read data block 72, whether or not the corresponding data block 72 is the last data block 72 in the printing cycle data unit 73 is determined (S107). When it is determined that the corresponding data block 72 is not the last data block 72 in the printing cycle data unit 73 (S107: NO), the next data block 72 is read (S105) and the process is repeated. Accordingly, all the data blocks 72 in the printing cycle data unit 73 are processed in sequence. At this time, as described above, the number of the data blocks 72 to be processed is determined in accordance with the relationship, in this case the number of discharge areas A to D opposite to the paper P being fed. The number of data blocks 72 of the printing cycle data unit 73 corresponds to the identified value relating to the head identifying data 74. Therefore, the number of data blocks 72 to be read in the respective printing cycle T is incremented in sequence from 1 to 4, and is decremented in sequence from 4 to 1 in association with feeding of the paper P. On the other hand, when it is determined that the corresponding data block 72 is the last data block 72 in the printing cycle data unit 73 (S107: YES), the printing data reading section 65 stops reading the data blocks 75 until the next printing cycle T, and performs preparation for transferring drive signals which are null data to the ink-jet heads 1a to 1d which are not identified by the previous head identifying data 74. When the ink-jet heads 1a to 1d, which are not identified by the previous head identifying data 74, do not exist, this process is not performed. Then, the head drive unit 66 transfers prepared drive signals to the respective ink-jet heads 1a to 1d at predetermined timings relating to the printing cycle T. Accordingly, the ink-jet heads 1a to 1d can be driven and ink drops can be discharged.

Then, whether or not the head identifying data 74 included in the data block 72 to be read last is null is determined (S110). When the corresponding head identifying data 74 is not null, the next data block 72 is read in the next printing cycle T (S105), and the processes is repeated. When the corresponding head identifying data 74 is null, the printing process for the paper P is terminated.

According to the illustrative embodiment described thus far, only the ink-jet heads 1a to 1d identified by the head identifying data 74 which are in a predetermined positional relationship with respect to the paper P is driven based on the head drive data 75 in the respective printing cycles T. Therefore, it is not necessary for the printing data storage unit 61 to store null data relating to the ink-jet heads 1a to 1d which are not in the predetermined positional relationship with respect to the paper P in the feeding direction in the respective printing cycles T. Accordingly, the drive timing may be differentiated without configuring the printing data storage unit 61 for the respective ink-jet heads 1a to 1d, and the storage capacity may be reduced. Accordingly, cost reduction of the ink-jet printer 101 can be achieved. Since it is no longer necessary to transfer the null data from the printing data storage unit 61 to the head drive unit 66, time required for transferring the print data may be reduced.

The head identifying data 74 and the head drive data 75 of the data block 72 each have a predetermined amount of data determined in advance, and the amount of data of the data block 72 can be transferred in parallel at a time through the data bus 64. Accordingly, a circuit configuration for reading the data block 72 may be simplified. Since the transfer efficiency of the printing data may be improved, the transfer time for the printing data may further be shortened.

Furthermore, since the head identifying data 74 of the block data serves as the identification signal relating to the ink-jet heads 1a to 1d, to which one of the ink-jet heads 1a to 1d the head drive data 75 of the block data to be read next corresponds may be determined easily.

An illustrative embodiment of the invention has been described thus far, but the invention is not so limited and it may be modified in the various manners within the scope of the appended claims. For example, in the above-described illustrative embodiment, the head identifying data 74 and the head drive data 75 of the data block 72 each have a predetermined amount of data determined in advance. However, a configuration in which the amount of at least one of the head identifying data and the head drive data is changed for each data block may also be applicable. Also, although the data block 72 is transferred at one time through the data bus 64, a configuration in which the data block 72 is transferred by being divided into pieces, or data blocks 72 are transferred at one time may also be applicable.

Although the head identifying data 74 is the specific identifiers "K", "C", "M", and "Y" assigned to the ink-jet heads 1a to 1d in the illustrative embodiment described above, other identifiers which can specify the ink-jet heads 1a to 1d may be employed.

Furthermore, although the printing data generating unit 71 of the PC 70 generates printing data and the generated printing data is transferred to the ink-jet printer 101 in the illustrative embodiment described above, a configuration in which the ink-jet printer includes the print data generating unit may also be applicable.

Although an example in which the invention is applied to the ink-jet printer 101 provided with the ink-jet heads 1a to 1d which discharge ink drops on the paper P has been described in the illustrative embodiment described above, the invention may be applied to other types of recording apparatus such as a printer having a thermal head for thermally transferring ink to the paper P.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Numerous other embodiments, modifications and variations within the scope and spirit of the appended claims will occur to persons of ordinary skill in the art from a review of this disclosure.

What is claimed is:

1. A recording apparatus comprising:
 a feeding device for feeding a recording medium in a feeding direction;
 a plurality of recording heads, each recording head arranged along the feeding direction and extending in a direction orthogonal to the feeding direction of the recording medium, the recording heads configured to oppose the recording medium being fed, and
 a control unit for controlling the recording heads, the control unit including a storage unit for storing printing cycle data for a plurality of printing cycles, for each of the printing cycles the printing cycle data includes head identifying data and head drive data, the head identifying data identifying each recording head in a corresponding predetermined positional relationship with the recording medium in the feeding direction,
  wherein as the recording medium advances in the feeding direction, the number of recording heads identified by the head identifying data in a printing cycle changes over time, and
 a drive unit for reading the printing cycle data associated with a corresponding one of the printing cycles stored in the storage unit and driving each recording head identified by the head identifying data based on the head drive data corresponding to the printing cycle data associated with the corresponding one of the printing cycles.

2. The recording apparatus according to claim 1, wherein the number of recording heads identified by the head identifying data in the printing cycle changes over time by incrementing by one to a maximum value equal to or smaller than the number of the recording heads and then decrementing by one from the maximum value to one.

3. The recording apparatus according to claim 1,
wherein in the printing cycle data, each head identifying data and the corresponding head drive data form a data block, and
wherein the drive unit reads the printing cycle data in units of data blocks including each head identifying data and the corresponding head drive data.

4. The recording apparatus according to claim 3, wherein when the head identifying data of a data block identifies an identifier corresponding to a recording head, the recording head is driven by the drive unit responsive to the head drive data in the next data block being read.

5. A computer system comprising:
a recording data generating apparatus configured to generate recording data including printing cycle data for a corresponding printing cycle, the printing cycle data including head identifying data and head drive data,
the head identifying data identifying each of a plurality of recording heads in a corresponding predetermined positional relationship with a recording medium in a feeding direction, wherein as the recording medium advances in the feeding direction, the number of recording heads identified by the head identifying data in a printing cycle changes over time, and
the head drive data relating to an image to be recorded by the respective recording heads indicated by the head identifying data in the respective printing cycles.

6. The computer system according to claim 5, wherein the number of recording heads identified by the head identifying data in the printing cycle changes over time by incrementing by one to a maximum value equal to or smaller than the number of the recording heads and then decrementing by one from the maximum value to one.

7. The computer system according to claim 5, wherein in the printing cycle data, each head identifying data and the corresponding head drive data form a data block, and the printing cycle data is read in units of data blocks including each head identifying data and the corresponding head drive data.

8. The computer system according to claim 7, wherein when the head identifying data of a data block identifies an identifier corresponding to a recording head, the recording head is driven responsive to the head drive data in the next data block being read.

9. A non-transitory computer readable medium having a computer program with computer-executable instructions stored thereon, which when executed by a computer, perform a method comprising:
generating recording data including printing cycle data for a corresponding printing cycle, the printing cycle data including head identifying data and head drive data,
the head identifying data identifying each of a plurality of recording heads in a corresponding predetermined positional relationship with a recording medium in a feeding direction, wherein as the recording medium advances in the feeding direction, the number of recording heads identified by the head identifying data in a printing cycle changes over time, and
the head drive data relating to an image to be recorded by the respective recording heads indicated by the head identifying data in the respective printing cycles.

10. The computer readable medium according to claim 9, wherein the number of recording heads identified by the head identifying data in the printing cycle changes over time by incrementing by one to a maximum value equal to or smaller than the number of the recording heads and then decrementing by one from the maximum value to one.

11. The computer readable medium according to claim 9, wherein in the printing cycle data, each head identifying data and the corresponding head drive data form a data block, and the printing cycle data is read in units of data blocks including each head identifying data and the corresponding head drive data.

12. The computer readable medium according to claim 11, wherein when the head identifying data of a data block identifies an identifier corresponding to a recording head, the recording head is driven responsive to the head drive data in the next data block being read.

* * * * *